L. J. LOGAN.
SHEEP BED GROUND.
APPLICATION FILED JULY 17, 1912.
1,085,815. Patented Feb. 3, 1914.
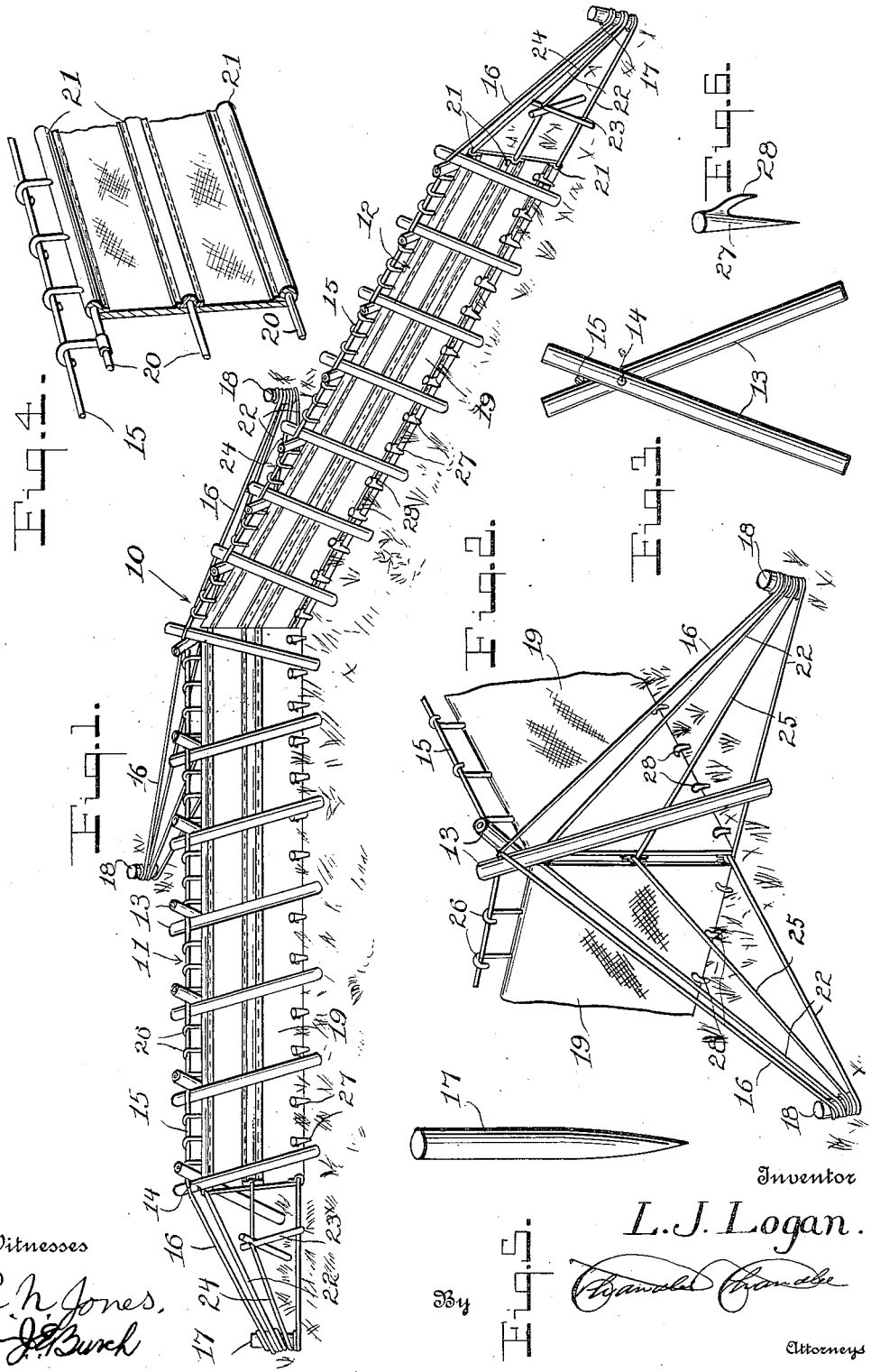
Inventor
L. J. Logan.

UNITED STATES PATENT OFFICE.

LEWIS J. LOGAN, OF DOUGLAS, WYOMING.

SHEEP BED-GROUND.

1,085,815.  Specification of Letters Patent.  Patented Feb. 3, 1914.

Application filed July 17, 1912. Serial No. 709,991.

*To all whom it may concern:*

Be it known that I, LEWIS J. LOGAN, a citizen of the United States, residing at Douglas, in the county of Converse, State of Wyoming, have invented certain new and useful Improvements in Sheep Bed-Grounds; and I do hereby declare the following to be a full, clear, and exact description of the invention, such as will enable others skilled in the art to which it appertains to make and use the same.

This invention relates to new and useful improvements in sheep bed grounds, or shelters, the object of the invention being to provide a simple, strong and durable sheltering device or barrier for cattle and especially for sheep so as to protect the latter from winds and storms to which they are exposed in prairie lands or pastures.

The invention resides more particularly in a novel form of barrier construction embodying diagonally braced or staggered supporting members and novel means for suspending and securing a canvas shelter therebetween for the protection of the sheep.

With these and other objects in view, this invention resides in the novel features of construction, formations, combinations and arrangements of parts to be hereinafter more fully described, claimed and illustrated in the accompanying drawing, in which:—

Figure 1 is a perspective view of the improved bed ground. Fig. 2 is a detail perspective view of the outside corner of the device. Fig. 3 is an enlarged end view showing the manner of arranging the supporting posts. Fig. 4 is a detailed view showing the arrangement of the supporting ropes and canvas barrier forming the part of the invention. Fig. 5 is a detail view of a stake employed at the ends and corner of the device. Fig. 6 is a detail perspective view of one of the stakes 27.

As illustrated, my improved bed ground or shelter is a substantially angular structure 10 having side portions 11 and 12 respectively arranged in the proper direction to resist wind or storms. Each side portion embodies a plurality of posts 13 which are arranged in staggered or inclined position so as to cross each other near their upper ends and connected by rods as at 14, such posts being preferably formed of hollow pipe sections and braced by longitudinal supporting ropes 15 where they cross each other so that the posts may be arranged at the proper distances spaced apart and with their lower ends resting upon or embedded in the ground surface and thereby firmly supported.

Ropes or cables 15 at the ends of the side portions are extended downwardly as shown at 16 and anchored to stakes 17 driven in the ground adjacent the ends of the side portions of the shelter and the portions of the ropes or cables at the corner of the device are extended downwardly and attached to stakes 18. By this means, the barrier or fence thus produced by the stakes and ropes connecting the same are firmly supported and said ropes also form supporting means for canvas barrier forming sections 19 which are arranged at a slight inclination between the said posts and which meet at the corner portions of the said ground or shelter. For this purpose, canvas sections are provided with longitudinally running and spaced rope sections 20 which are secured in pockets or seams 21 at the top and bottom edges and centrally of the height of the said canvas sections, while the upper and lower rope sections are extended toward the stakes 17 as shown at 22 and securely anchored to prevent sagging of the canvas and produce a more efficient barrier forming wall. The intermediate rope section 20 is extended over a pair of crossed posts 23 which are considerably shorter than the posts 13 and which form supporting means for the canvas sections at their centers before the ropes are extended downwardly as shown at 24 and attached to the stakes 17. These latter ropes are also extended downwardly as shown at 25 and attached to the corner stakes 18 while the top edges of the canvas sections are supported on the ropes 15 by means of hooks 26 which are secured to the top edges of the canvas sections and which engage over said ropes 15 as illustrated. The lower edges of the canvas sections are embedded in the ground surface by means of stakes 27 which have offset securing extensions 28 which engage through the bottom portions of the canvas sections to embed and hold the latter in positive contact with the ground surface.

From the foregoing description taken in connection with the accompanying drawing, it will be evident that a bed ground or shelter for sheep has thus been provided which will be very rigidly supported and which may be quickly set up in any convenient place so that the sheep will be thoroughly protected from winds and storms. It is of course obvious that any form of bedding may be arranged in the ground surface protected by the device.

Having thus fully described this invention what I claim as new and desire to protect by Letters Patent, is:—

A shelter comprising an angular barrier having divergent canvas wings, upper lower and central longitudinal ropes firmly secured to said canvas wings and projecting beyond the ends of the latter, a plurality of posts crossed near the upper ends and straddling said wings, stakes at the ends of said wings, all of said ropes being terminally secured to said stakes, a suspension rope trained through the forks formed by the crossings of said posts and terminally connected to said stakes, hooks carried by said upper longitudinal rope and engaging said suspension rope, other hooks driven into the ground and engaging said lower longitudinal rope, stakes spaced apart on opposite sides of that pair of posts which straddle the meeting of said wings, and guy ropes extending from said longitudinal ropes to the last named stake for anchoring the meeting of said wings.

In testimony whereof, I affix my signature, in presence of two witnesses.

LEWIS J. LOGAN.

Witnesses:
C. A. WILLIS,
L. W. CLELLAND.

Copies of this patent may be obtained for five cents each, by addressing the "Commissioner of Patents, Washington, D. C."